Patented July 13, 1926.

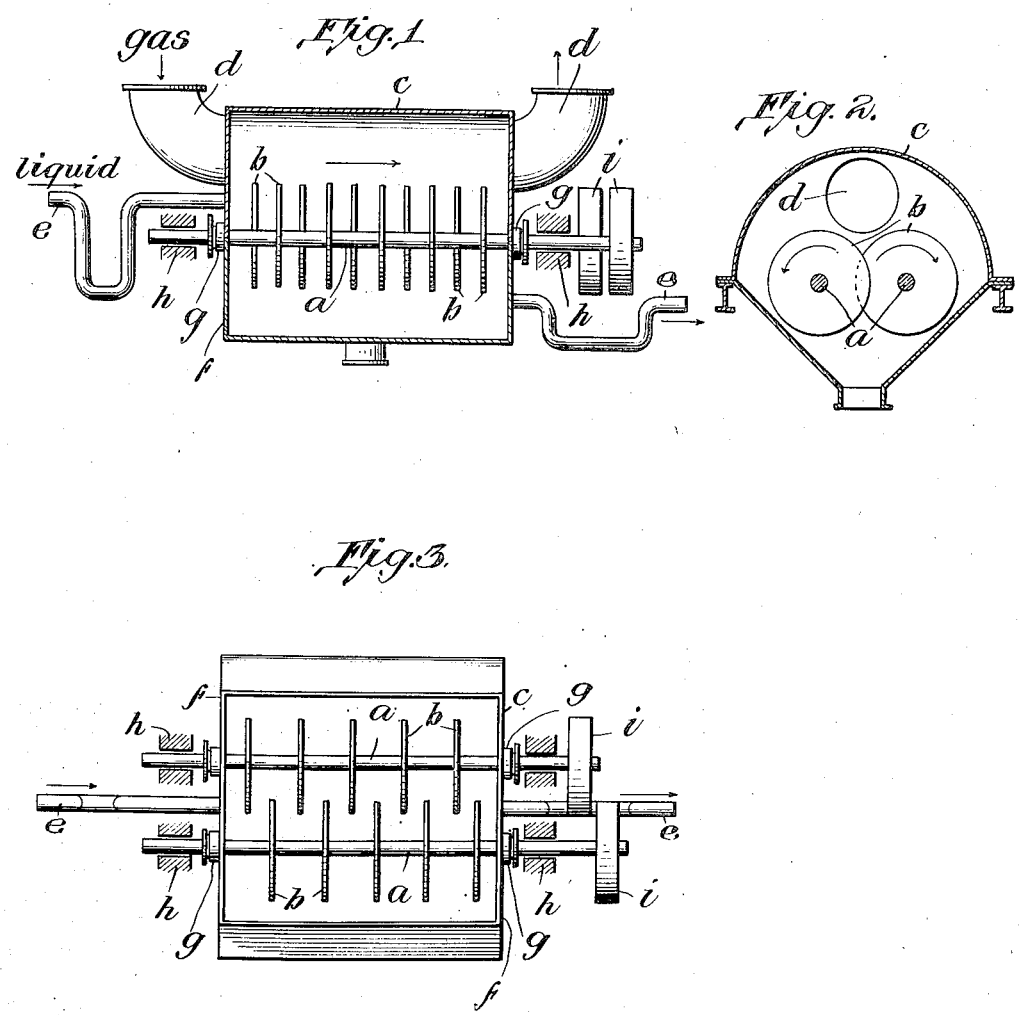

1,592,231

UNITED STATES PATENT OFFICE.

EUGEN STRÖDER, OF LEVERKUSEN, NEAR COLOGNE-ON-THE-RHINE, GERMANY, ASSIGNOR TO FARBENFABRIKEN VORM. FRIEDR. BAYER AND CO., OF LEVERKUSEN, NEAR COLOGNE-ON-THE-RHINE, GERMANY.

APPARATUS FOR INTIMATELY MIXING GASES AND LIQUIDS.

Application filed June 8, 1923, Serial No. 644,232, and in Germany June 20, 1922.

This invention relates to an improved apparatus for producing intimate mixture between gases and liquids and has for its object to effect such intimate mixture in an exceedingly simple manner.

According to this invention a gas in its travel through a chamber meets with films of liquid moving in opposite directions and adapted to cause deviations in the direction of the travel of the gas.

The apparatus comprises a chamber, at least two parallel shafts rotated in opposite directions and disks on the shafts partially immersed in the liquid, the disks on one shaft not coinciding with the disks on the other shaft.

The gas enters into the chamber at one end, traverses in sequence the films of liquid spread out by the disks, being caught by and travelling with such films and disks, while the liquid particles bombarding the walls of the chamber return to the bottom of the chamber in the form of spray and so again act on the gas.

This apparatus is suitable both for purifying and for drying gases and for absorbing gases as in all these cases the period of contact of the gases with the liquid is prolonged to a very large extent owing to the increased length of the path which the gas must travel in the chamber.

The invention is illustrated in the accompanying drawing in which Figure 1 is a longitudinal vertical section of a mixing apparatus, Figure 2 a cross section and Figure 3 a plan thereof.

Referring to the drawing, $c$ is a chamber, $a, a$, two parallel shafts passing through the walls $f$ of said chamber, $g$ being stuffing boxes and $h$ bearings for the shaft; each shaft $a$ is provided with a series of disks $b$ dipping into the liquid contained in chamber $c$; one series of disks $b$ is arranged staggered with relation to the other series and are driven in opposite directions by pulleys $i$.

The inlet and the outlet for the gas is designated by $d$ and the inlet and the outlet for the liquid is designated by $e$.

The gas in passing into the chamber $c$ is made to move in one direction by the film of liquid formed by the first disk $b$ on the one shaft and then in the reverse direction by the film of liquid formed by the first disk on the other shaft and then again in the first direction by the film of liquid formed by the second disk on the first mentioned shaft and so on. It will be seen that the period of contact between gas and liquid can be increased within limits to any extent desired.

I claim:—

Apparatus for intimately mixing a gas and a liquid, comprising two substantially parallel horizontal shafts, disks on the shafts disposed in staggered relation, means for revolving the shafts in opposite directions, a casing surrounding the shafts and disks defining a receptacle for liquid below the disks and a gas space above the disks and means for passing gas through said gas space, said means including inlet and outlet openings respectively in alignment with each other and the gas space.

In testimony whereof I have hereunto set my hand.

EUGEN STRÖDER.